United States Patent [19]

McMaster et al.

[11] Patent Number: 5,772,715
[45] Date of Patent: Jun. 30, 1998

[54] SYSTEM AND METHOD FOR PROCESSING SHEET GLASS

[75] Inventors: Harold A. McMaster, Perrysburg; James B. Foote, Toledo, both of Ohio; Alan J. McMaster, Dexter, Mich.

[73] Assignee: Solar Cells, Inc., Toledo, Ohio

[21] Appl. No.: 783,935

[22] Filed: Jan. 17, 1997

[51] Int. Cl.[6] .................................................. C03B 18/16
[52] U.S. Cl. .................................. 65/32.1; 65/90; 65/157; 65/374.15
[58] Field of Search .............................. 65/157, 529, 530, 65/203, 374.15, 32.1, 60.1, 90, 99.1, 99.2, 100, 101; 34/242; 414/217

[56] References Cited

U.S. PATENT DOCUMENTS

| | | | |
|---|---|---|---|
| 2,384,500 | 9/1945 | Stoll | 427/251 |
| 3,057,792 | 10/1962 | Fröhlich | 204/165 |
| 3,351,450 | 11/1967 | Silverwood | 65/157 |
| 3,351,451 | 11/1967 | Barradell-Smith et al. | 65/157 |
| 3,667,626 | 6/1972 | Torelli et al. | 414/217 |
| 4,664,951 | 5/1987 | Doehler | 427/248.1 |
| 4,797,054 | 1/1989 | Arii | 414/217 |
| 5,102,279 | 4/1992 | Ezaki et al. | 414/217 |
| 5,248,349 | 9/1993 | Foote et al. | 136/260 |
| 5,372,646 | 12/1994 | Foote et al. | 118/719 |
| 5,470,397 | 11/1995 | Foote et al. | 136/260 |
| 5,536,333 | 7/1996 | Foote et al. | 136/260 |

Primary Examiner—Stanley S. Silverman
Assistant Examiner—Sean Vincent
Attorney, Agent, or Firm—Brooks & Kushman P.C.

[57] ABSTRACT

A processing system (20,20') for processing sheet glass G includes a housing (22) and at least one slit seal (38i,38i', 38e,38e') constructed to permit continuous passage of sheet glass in an efficient manner without fluttering. The slit seal functions as both an ingress slit seal (38i,38i') and as an egress slit seal (38e,38e'). Each slit seal has side seals (100, 102, 112, 114) and preferably has three stages of vacuum drawn by an associated first, second and third vacuum pumps (80,82,84). The sealing method for use in processing sheet glass has particular utility in connection with depositing semiconductor materials for photovoltaics and can be performed on either discrete glass sheets (28) or a continuous glass ribbon (30).

28 Claims, 9 Drawing Sheets

SYSTEM AND METHOD FOR PROCESSING SHEET GLASS

TECHNICAL FIELD

This invention relates to a processing system for processing sheet glass and also relates to a method for processing the sheet glass.

BACKGROUND ART

Processing systems for processing discrete glass sheets utilized in photovoltaics have previously incorporate load locks for introducing the glass sheets into an enclosed processing chamber having a contained environment and for subsequently delivering the process glass sheets from the processing chamber. See, for example, the U.S. Pat. Nos. of Foote et al: 5,248,349; 5,372,646; 5,470,397; and 5,536,333, all of which are assigned to the assignee of the present application. See also U.S. Pat. No. 4,797,054 Ari which discloses load locks utilized in the discrete sheet processing. Systems using load locks can only process discrete sheets and are incapable of processing a continuous glass ribbon. Furthermore, the opening and closing of the load locks involves moving parts that can cause reliability problems as well as being costly to install and operate. In addition, load lock systems have production output that is limited by the cycle time involved with opening and closing the load locks and drawing a vacuum during each cycle of operation. Such load locks also increase the length of the processing system and the factory space needed for operation which further increases the resultant cost of the processed glass sheets.

Sheet processing systems have also included slit type seals through which passage takes place into and out of system chambers such as disclosed by U.S. Pat. Nos. 2,384, 500 Stoll; 3,057,792 Frohlich; 3,667,626 Torelli et al; 4,664, 951 Doehler; and 5,102,279 Ezaki et al. In the Ezaki patent, the sheet processing is disclosed as being performed on a flexible object such as a plastic film that is tensioned by rolls and moved through slit seals both into and out of the processing chamber. The extent of the slit in this type of system can be relatively small, i.e. 30 microns which is just slightly greater than one thousandth of an inch. However, that small of a slit is not practical for sheet glass processing where variations in thickness and/or planarity can prevent passage through the slit seal.

DISCLOSURE OF INVENTION

One object of the present invention is to provide an improved processing system for processing sheet glass.

In carrying out the above object, a processing system for processing sheet glass of a predetermined thickness is constructed to include a housing having an enclosed processing chamber in which the sheet glass is processed. The system includes a slit seal through which the sheet glass is movable between the chamber and the environment and has an outer end communicated with the environment. The slit seal defines a slit that has an inner end communicated with the chamber. The slit seal has a thickness that is between 0.005 and 0.040 of an inch greater than the thickness of the sheet glass. An evacuation port of the slit seal is located on opposite sides of the sheet glass at a location inwardly from the outer end of the slit seal. A pump provides for drawing a vacuum within the evacuation port and has sufficient pumping capacity such that the vacuum in the evacuation port at the sheet glass is less than 0.53 atmospheres of pressure so a shock wave forms. The evacuation port is located sufficiently close to the outer end of the slit seal so pressure differences on the opposite sides of the sheet glass do not cause fluttering thereof within the slit seal. The slit seal also includes side seals.

The construction of the slit seal of the processing system permits passage of sheet glass with variations in thickness, width and/or planarity and also permits efficient pumping of the vacuum by providing the shock wave as well as preventing any fluttering of the sheet glass by locating the evacuation port sufficiently close to the outer end of the slit seal.

In its preferred construction, the processing system for processing sheet glass has the slit seal constructed to include the first mentioned evacuation port as well as including a second pump for drawing a vacuum within a second evacuation port and having sufficient pumping capacity such that the vacuum in the second evacuation port at the sheet glass is less than 0.53 times the pressure within the first mentioned evacuation port so a second shock wave forms. This second evacuation port is also located sufficiently close to the first mentioned evacuation port so pressure differences on the opposite sides of the sheet glass do not cause fluttering thereof within the slit seal.

In addition, the preferred construction of the processing system also has the slit seal constructed to include a third evacuation port located on the opposite sides of the sheet glass at a location inwardly from the second evacuation port as well as providing a third pump for drawing a vacuum within the third evacuation port and having sufficient pumping capacity such that the vacuum in the third evacuation port at the sheet glass is less than 0.53 times the pressure within the second evacuation port so a third shock wave forms. This third evacuation port is located sufficiently close the second evacuation port so pressure differences on the opposite sides of the sheet glass do not cause fluttering thereof within the slit seal.

The slit seal of the processing system is disclosed as being both an ingress slit seal through which the sheet glass enters the chamber and as an egress slit seal through which the sheet glass exits the chamber. Thus, the slit seal as described above is provided as an ingress slit seal through which the sheet glass enters the chamber and the system further includes an egress slit seal through which the sheet glass exits the chamber. The egress slit seal defines a slit that has an outer end communicated with the environment and an inner end communicated with the chamber, and the slit of the egress slit seal has a thickness that is between 0.005 and 0.040 of an inch greater than the thickness of the sheet glass. An evacuation port is located on opposite sides of the sheet glass at a location inwardly from the outer end of the slit of the egress slit seal. A pump for drawing a vacuum within the evacuation port of the egress slit seal is provided and has sufficient pumping capacity such that the vacuum in the evacuation port of the egress slit seal at the sheet glass is less than 0.53 atmospheres of pressure so a shock wave forms. This evacuation port of the egress slit seal is located sufficiently close to the outer end of its slit so pressure differences on opposite sides of the sheet glass do not cause fluttering thereof within the egress slit seal.

The egress slit seal is also constructed to include a second evacuation port located on the opposite sides of the sheet glass at a location inwardly from the first mentioned evacuation port of the egress slit seal. A second pump draws a vacuum within the second evacuation port of the egress slit seal and has sufficient pumping capacity such that the vacuum in the second evacuation port of the egress slit seal at the sheet glass is less than 0.53 times the pressure within the first mentioned evacuation port of the egress slit seal so a second shock wave forms. This second evacuation port of the egress slit seal is located sufficiently close to its first mentioned evacuation port so pressure differences on the opposite sides of the sheet glass do not cause fluttering thereof within the egress slit seal.

In addition, the egress slit seal is disclosed as including a third evacuation port located on the opposite sides of the sheet glass at a location inwardly from the second evacuation port of the egress slit seal. A third pump draws a vacuum within the third evacuation port of the egress slit seal and has sufficient pumping capacity such that the vacuum in the third evacuation port of the egress slit seal at the sheet glass is less than 0.53 times the pressure within the second evacuation port of the egress slit seal so a third shock wave forms. This third evacuation port of the egress slit seal is located sufficiently close to its second evacuation port so pressure differences on the opposite sides of the sheet glass do not cause fluttering thereof within the egress slit seal.

In the preferred construction disclosed, the slit seal includes a roll seal assembly having a roll that seals in rolling contact with the sheet glass surface that is not being processed. In some applications the slit seal may also include a pair of such roll seal assemblies located on the opposite sides of the sheet glass so as to seal in rolling engagement with both sheet glass surfaces. Each roll seal assemblies preferably includes a graphite roll that engages the sheet glass being moved through the slit seal at a location outwardly from its outer end.

As previously mentioned, the processing system is also disclosed as having the slit seal provided with side seals. These side seals in one construction are disclosed as including outer and inner edges that form a tapered shape. In another construction, the side seals include outer and inner edges that extend parallel to each other.

One embodiment of the processing system includes metal plates that define the slit of the slit seal. This embodiment of the processing system also includes a roll conveyor for conveying the sheet glass through the slit seal.

Another embodiment of the processing system includes refractory members that define the slit of the slit seal. This embodiment also includes at least one slide member on which the sheet glass is slidably movable through the slit seal. The slide member is disclosed as being made of graphite so as to have high temperature resistance as well as good lubricity.

Another object of the present invention is to provide an improved method for processing sheet glass of a predetermined thickness within an enclosed processing chamber.

In carrying out the above object and other objects of the invention, the method for processing sheet glass is performed by passing the sheet glass through a slit seal having a slit that communicates the processing chamber and the environment, that has a thickness between 0.005 and 0.040 of an inch greater than the thickness of the sheet glass and that has side seals for sealing with the sheet glass. The method is also performed by drawing a vacuum within an evacuation port of the slit seal on opposite sides of the sheet glass with sufficient capacity so the vacuum in the evacuation port at the sheet glass is less than 0.53 atmospheres of pressure so a shock wave forms. This vacuum is drawn within the evacuation port at a location sufficiently close to the outer end of the slit of the slit seal so pressure differences on opposite sides of the sheet glass do not cause fluttering thereof within the slit seal.

In the preferred practice of the method for processing sheet glass, a second vacuum is also drawn within a second evacuation port located on opposite sides of the sheet glass at a location inwardly from the first mentioned evacuation port and with sufficient capacity so the vacuum in the second evacuation port at the sheet glass is less than 0.53 times the pressure within the first mentioned evacuation port such that a second shock wave forms. This vacuum is drawn within the second evacuation port at a location sufficiently close to the first mentioned evacuation port so pressure differences on the opposite sides of the sheet glass do not cause fluttering thereof within the slit seal.

In addition, the method is also preferably performed by drawing a vacuum within a third evacuation port located on opposite sides of the sheet glass at a location inwardly from the second evacuation port and with sufficient pumping capacity so the vacuum in the third evacuation port at the sheet glass is less than 0.53 times the pressure within the second evacuation port such that a third shock wave forms. This vacuum is drawn in the third evacuation port at a location sufficiently close to the second evacuation port so pressure differences on the opposite sides of the sheet glass do not cause fluttering thereof within the slit seal.

The method for processing sheet glass is disclosed as being performed by introducing the sheet glass into the chamber through the slit seal and is also disclosed as being performed by delivering the sheet glass out of the chamber through the slit seal with the preferred construction having the sheet glass both introduced into the chamber through the slit seal and delivered out of the chamber through another slit seal of the same construction as the first mentioned slit seal.

During its movement, the sheet glass is disclosed as being conveyed on a roll conveyor through the slit seal in one practice and is disclosed as being supported by at least one slide member during movement through the slit seal in another practice.

The method for processing sheet glass is disclosed in one practice with the sheet glass moved through the slit seal being discrete glass sheets. In another practice, the method for processing sheet glass is disclosed as having the sheet glass moved through the slit seal being a continuous glass ribbon.

The objects, features and advantages of the present invention are readily apparent from the following detailed description of the best modes for carrying out the invention when taken in connection with the accompanying drawings.

BEST MODES FOR CARRYING OUT THE INVENTION

Figure 1:
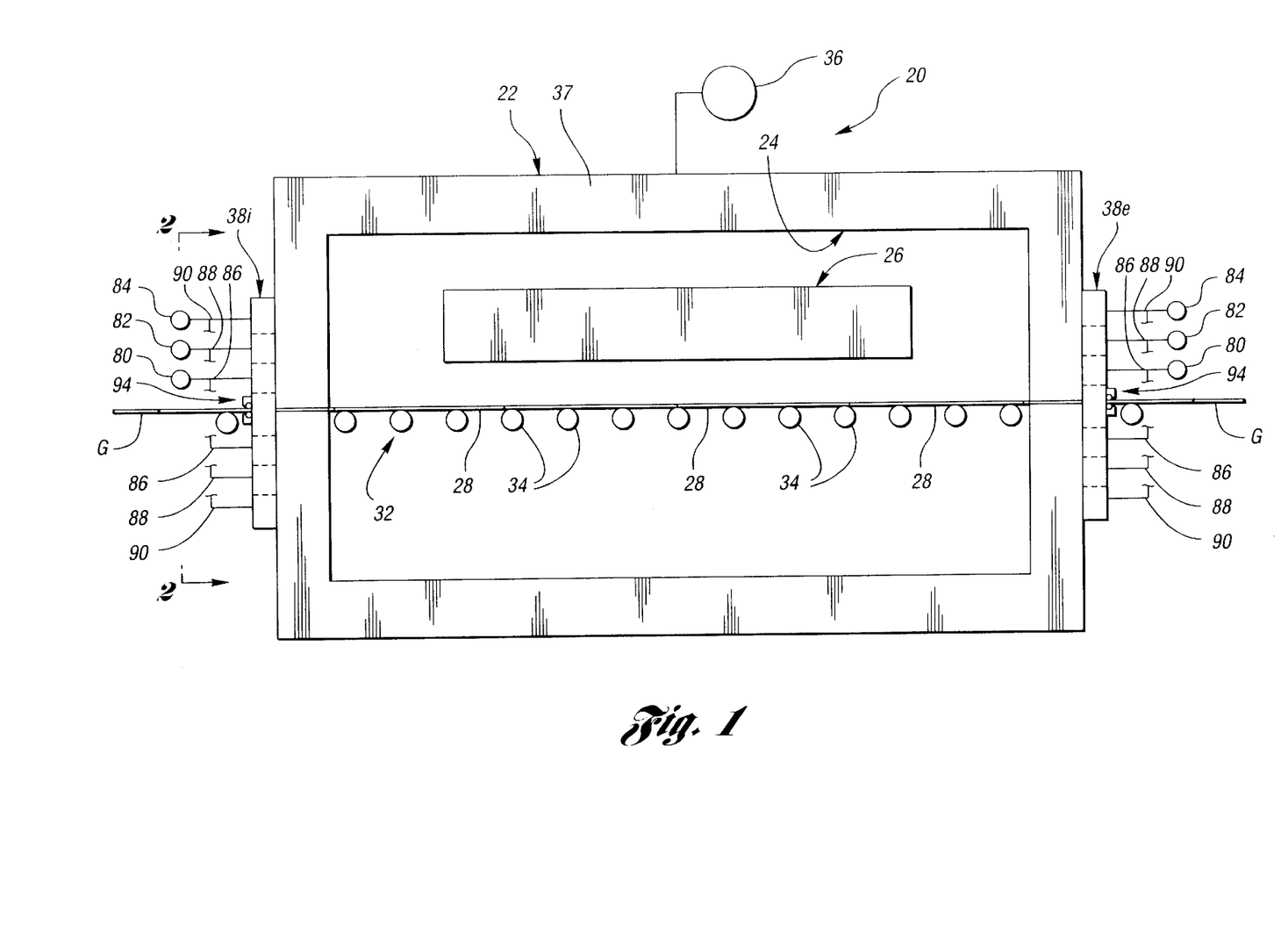
FIG. 1 is a longitudinal elevational view taken in section through a sheet glass processing system constructed in accordance with the present invention.

With reference to FIG. 1 of the drawings, a processing system generally indicated by 20 provides processing of sheet glass G of a predetermined thickness as is hereinafter more fully described. System 20 includes a housing 22 having an enclosed processing chamber 24 in which processing of the sheet glass takes place. More specifically, in the system disclosed, the processing includes deposition apparatus 26 for depositing semiconductor material, such as disclosed by the U.S. Pat. Nos. 5,248,349, 5,372,646, 5,470,397 and 5,536,333 of Foote et al, onto the sheet glass G. The sheet glass G on which the deposition is performed may be either discrete sheets 28 as is hereinafter more fully described in connection with FIG. 14 or a continuous glass ribbon 30 as is hereinafter more fully described in connection with FIG. 15. This embodiment of the processing system 20 shown in FIG. 1 has the sheet glass G conveyed by a roll conveyor 32 including conveyor rolls 34. Furthermore, the system 20 includes a vacuum pump 36 that draws a vacuum within the housing chamber 24 in a manner that provides a contained environment in which semiconductor gases provided by the deposition apparatus 26 may be deposited onto the sheet glass G. Heating is also provided within the housing chamber 24 in the specific processing system disclosed as set forth by the above referenced Foote et al patents. In order to retain the heat, the housing 22 includes wall insulation 37.

With continuing reference to FIG. 1, the processing system 20 also includes an ingress slit seal 38i though which the sheet glass G is introduced into the housing chamber 24 at its left end as illustrated While conveyed on the roll conveyor 32. In addition, the processing system includes an egress slit seal 38e through which the sheet glass G after processing is delivered outwardly from the housing chamber 24 at its right end as illustrated. These ingress and egress slit seals 38i and 38e are respectively illustrated in greater detail in FIGS. 3 and 4 and generally have the same construction and function the same as each other except that the ingress slit seal 38i is utilized for the introduction of the sheet glass G into the housing chamber prior to the processing and the egress slit seal 38e provides for the delivery of the sheet glass G after the processing has been performed.

Figure 2:
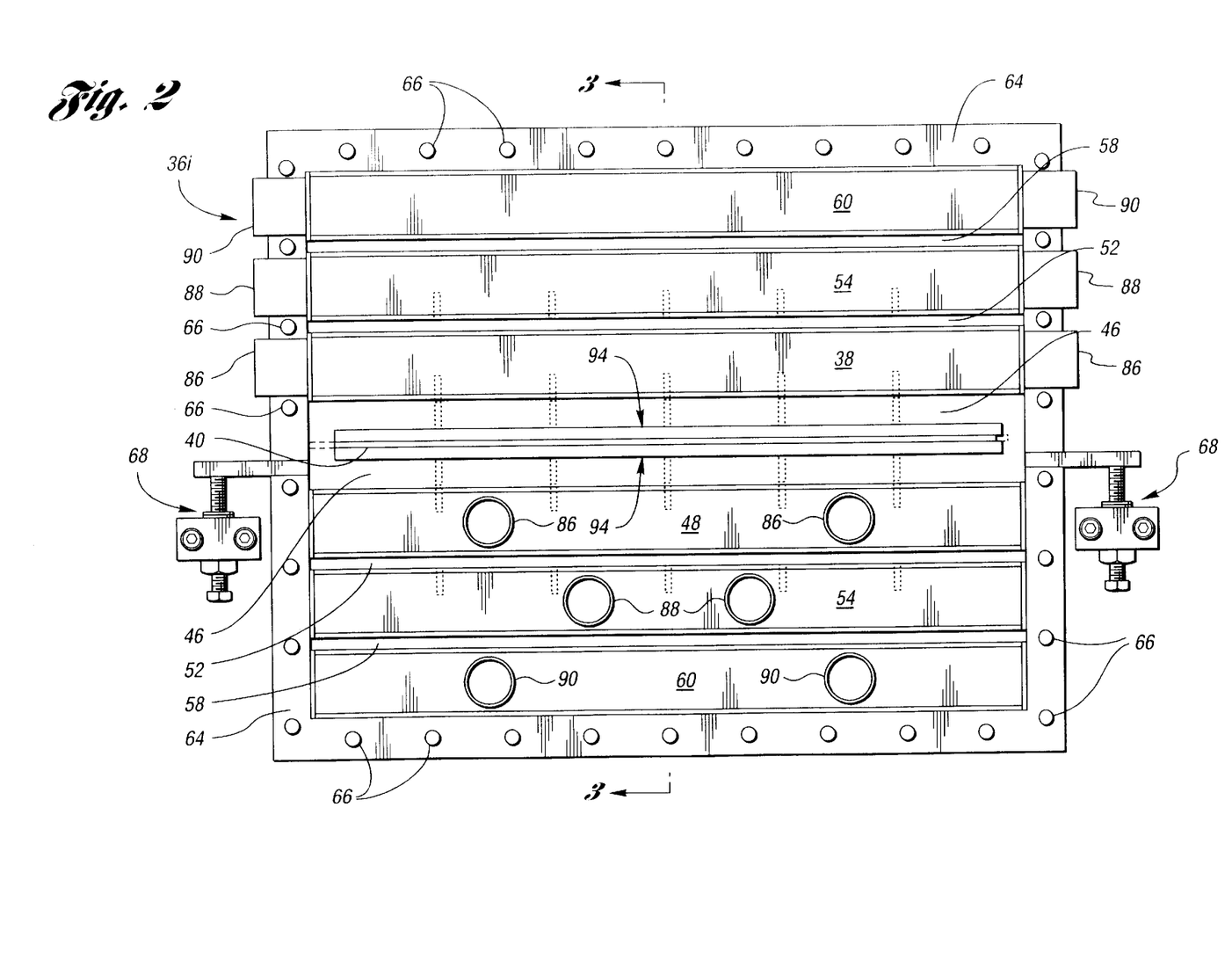
FIG. 2 is an end view taken along the direction of line 2—2 in FIG. 1 to illustrate a slit seal of the processing system which at the end illustrated is an ingress slit seal.
Figure 5:
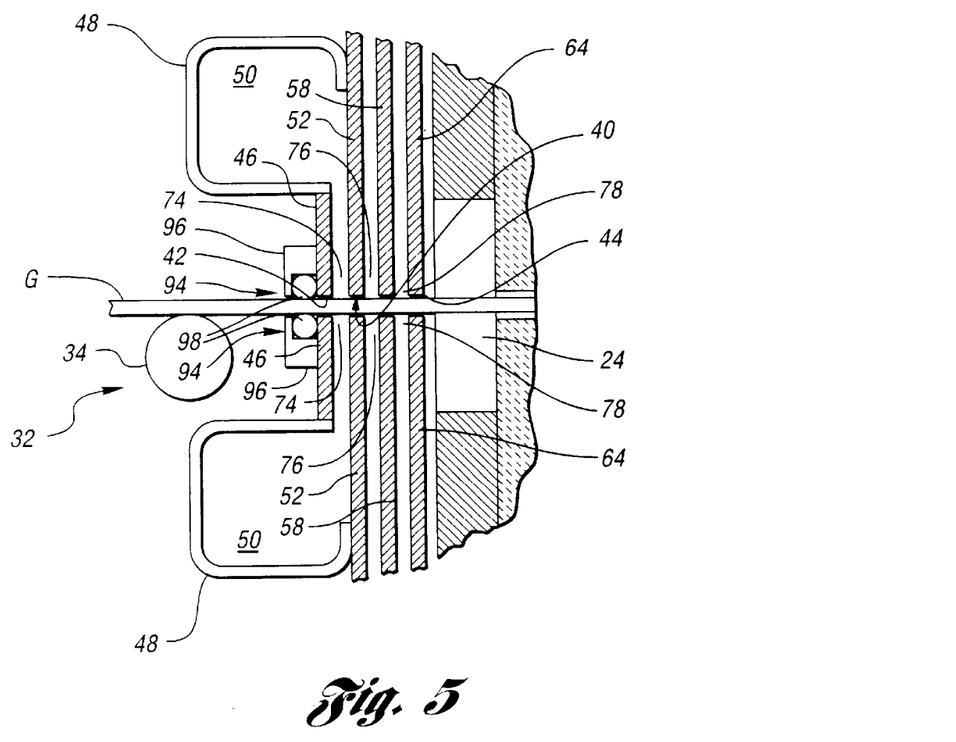
FIG. 5 is a partial view similar to FIG. 3 further illustrating the construction of the slit seal.
Figure 6:
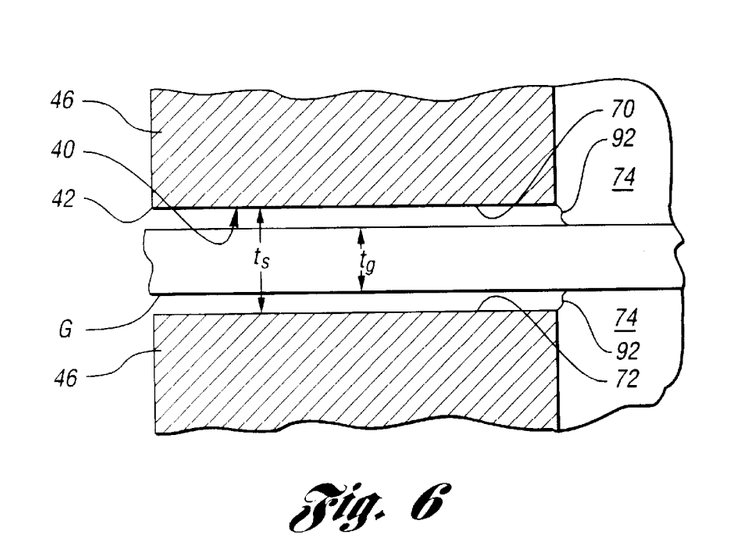
FIG. 6 is an enlarged view taken in the same direction as FIG. 5 to illustrate the manner in which a shock forms on opposite sides of the sheet glass being passed through the slit seal.

With reference to FIG. 2, the illustrated end view of the ingress slit seal 38i is also illustrative of the end view of the egress slit seal 38e. The ingress slit seal assembly 38i defines a slit 40 that, as best illustrated in FIG. 5, has an outer end 42 communicated with the environment and an inner end 44 communicated with the housing chamber 24. The slit 40 as best illustrated in FIG. 6 has a thickness $t_s$ that is between 0.005 and 0.040 of an inch greater than the thickness $t_g$ of the sheet glass G that is passed through the slit. The spacing between the sheet glass G and the upper and lower extremities of the slit is thus exaggerated for purposes of illustration. This tolerance range between the slit thickness $t_s$ and the sheet glass thickness $t_g$ accommodates for variances in the sheet glass thickness and/or planarity such that the sheet glass can be passed through the slit 40 while still permitting a vacuum to be drawn as is hereinafter more fully described.

Figure 3:
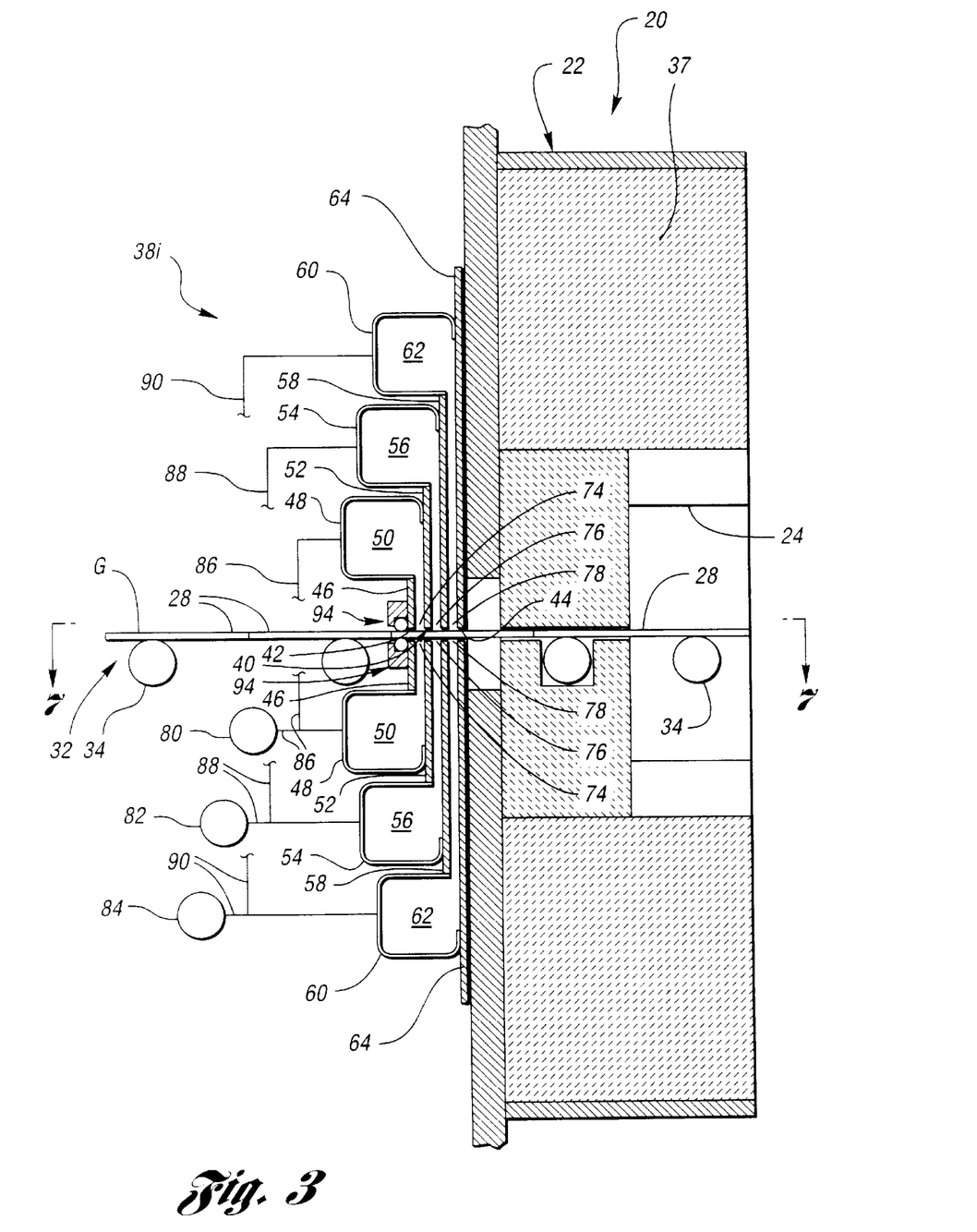
FIG. 3 is a sectional view taken along the direction of line 3—3 in FIG. 2 to illustrate the construction of the ingress slit seal.
Figure 4:
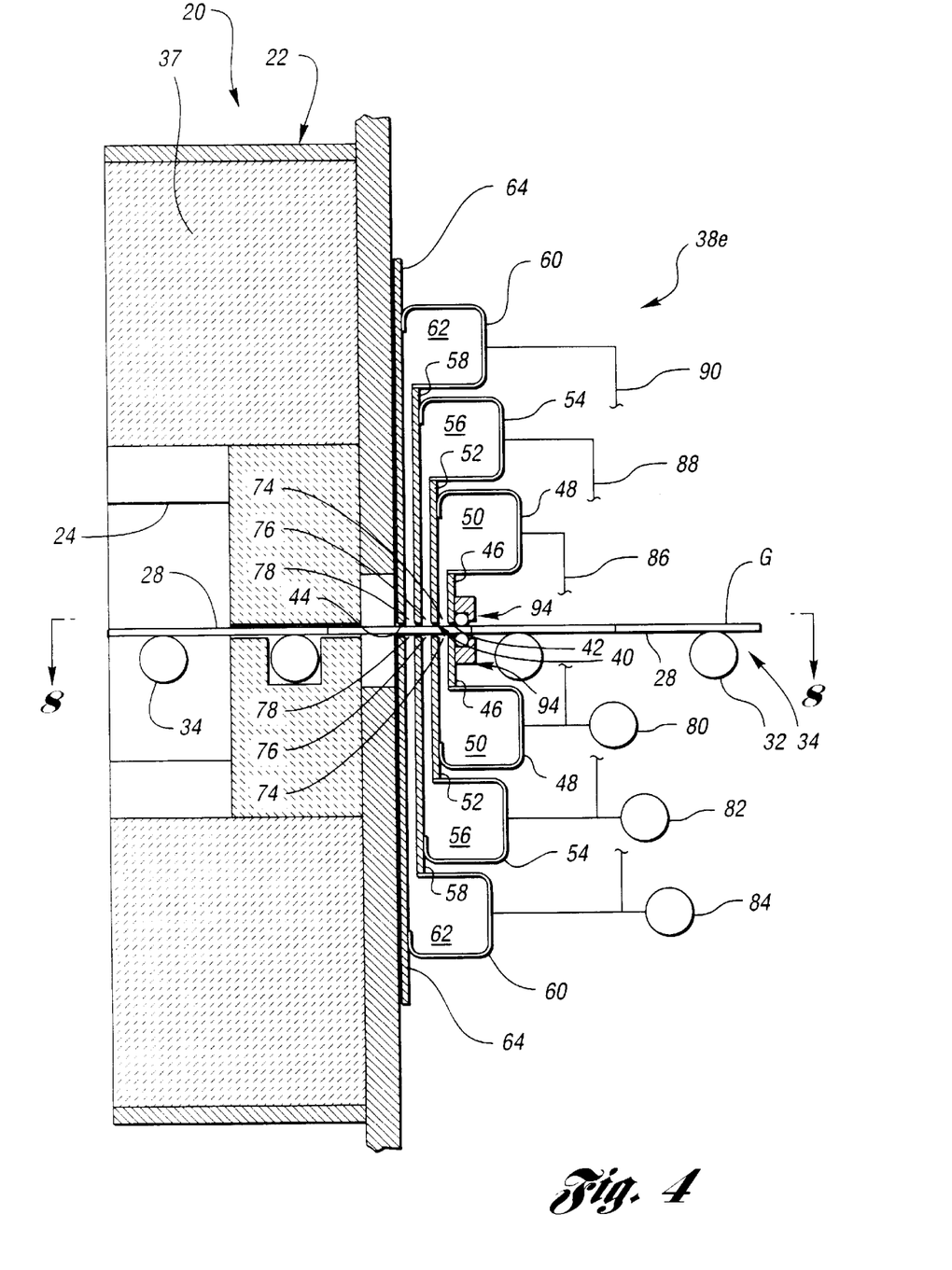
FIG. 4 is a view similar to FIG. 3 but taken at the other end of the processing system to illustrate an egress slit seal of the invention.

With reference to FIGS. 3 and 4, both the ingress slit seal 38i and the egress slit seal 38e have a flat metal plate and formed sheet metal construction provided by welding of the components to each other as is hereinafter more fully described. This construction of the slit seal provides a three-stage vacuum drawing process as is also herein more fully described. More specifically, each of the ingress and egress slit seals 38i and 38e includes upper and lower outer metal plates 46 and upper and lower formed sheet metal housings 48 that respectively define upper and lower first stage vacuum chambers 50. The slit seals also each include a second pair of upper and lower metal plates 52 and a second pair of formed sheet metal housings 54 that define a second pair of upper and lower vacuum chambers 56. Furthermore, each slit seal includes a third pair of upper and lower metal plates 58 and a third pair of upper and lower formed sheet metal housings 60 that respectively define a third pair of upper and lower vacuum chambers 62. In addition, each slit seal includes a fourth pair of upper and lower metal plates 64. As illustrated in FIG. 2, the opposite lateral ends of the pairs of metal plates 46, 52, 58 and 64 are connected to each other at the lateral ends of the slit 40 and suitable fasteners 66 secure the plates 64 to the system housing. The connections provided by the fasteners 66 may be of the vertical slot and threaded pin type so as to provide vertical adjustability of the positioning of the slit 40. Suitable height adjusters 68 mounted on the system housing have threaded adjustment for supporting the pair of plates 64 and the other plates supported thereby in an adjustable manner prior to completing the securement by the fasteners 66.

With reference to FIGS. 5 and 6, each pair of upper and lower metal plates 46, 52, 58 and 64 has an upper downwardly facing surface and a lower upwardly facing surface that define the slit 40, these surfaces are respectively designated as 70 and 72 in FIG. 6 in association with the one pair of metal plates 46. Thus, between the upper downwardly facing surface 70 and the lower upwardly facing surface 72, the metal plates define the thickness $t_s$ of the slit which, as previously mentioned, is between 0.005 and 0.040 of an inch greater than the thickness $t_g$ of the sheet glass G that passes through the slit seal.

As illustrated in FIGS. 3, 4 and 5, the pairs of upper and lower metal plates 46, 52, 58 and 64 are spaced from each other by suitable unshown spacers and define first, second and third evacuation ports 74, 76 and 78 on opposite sides of the sheet glass. Furthermore, first, second and third vacuum pumps 80, 82 and 84 are respectively connected by conduits 86, 88 and 90 to the first, second and third vacuum chambers 50, 56 and 62 in order to draw a vacuum which is thus drawn within the associated evacuation ports 74, 76 and 78 both above and below the sheet glass G. As shown in FIG. 2, the conduits 86, 88 and 90 are respectively connected to the upper vacuum chamber housings 48, 54 and 60 at their opposite lateral ends. Furthermore, the conduits 86, 88 and 90 are respectively connected to the lower vacuum chamber housings 48, 54 and 60 at laterally spaced locations intermediate their opposite ends. Suitable valves can be provided at each stage to adjust the vacuum drawn at the upper and lower side of the sheet glass G. While it is also possible to draw the vacuum at the upper and lower sides of the sheet glass G at each stage with a pair of vacuum pumps, provision of one vacuum pump and suitable control valving can be more cost effective.

With reference to FIGS. 3 and 4, each seal assembly 38*i* and 38*e* thus has its first evacuation port 74 located above and below the sheet glass G between the adjacent pair of upper and lower metal plates 46 and 52. A vacuum is drawn in this first evacuation port 74 by the first vacuum pump 86 which has a sufficient pumping capacity such that the vacuum therein at the sheet glass G is less than 0.53 atmospheres of pressure, which is a critical flow pressure that causes a shock wave to form. As illustrated in FIG. 6, the air drawn into the slit 40 starts at the outer end 42 adjacent the environment with essentially zero velocity and upon expansion accelerates to the speed of sound such that a shock wave is formed normally at the location 92 illustrated just after reaching the first evacuation port 74. Since the air cannot travel faster within the slit 40 than the speed of sound, a much greater vacuum can be drawn within the first evacuation port 74. Thus increased vacuum pumping does not cause greater mass flow of air but rather causes a further decrease in the vacuum. Specifically, it is possible to efficiently draw the vacuum in the first evacuation port 74 to a pressure of 20 to 75 torr which is thus about 0.1 atmospheres or less. It should also be noted that when discrete glass sheets are processed, a discontinuity at their junctions can cause gas expansion that would cause the shock wave to form outwardly from the location at which the slit 40 opens to the evacuation port 74.

With continuing reference to FIG. 6, the first evacuation port 74 of each slit seal is located sufficiently close to the outer end of the slit 70 so pressure differences on the opposite sides of the sheet glass G do not cause fluttering thereof within the slit seal. More specifically, if the distance between the first evacuation port 74 and the outer end 42 of the slit 40 is too great, a slight movement of the sheet glass upwardly or downwardly will cause a pressure differential between its upper and lower sides due to the decrease in flow area in the direction toward which the sheet glass moves and an increase in flow area in the other direction. If the distance between the first evacuation port 74 and the outer end 72 of the slit 40 is too great, that pressure differential can move the sheet glass G rapidly in the opposite direction which then reverses the direction of the pressure differential and causes rapid reverse movement that provides fluttering. However, if the distance between the first evacuation port 74 and the outer end 42 of the slit 40 is made sufficiently small, the area on which the pressure differential acts is not sufficient to cause such fluttering. Testing has indicated that when utilizing 3/16 inch thick glass and drawing a vacuum within the first evacuation port 74 at 50 to 75 torr, a distance of six inches will cause fluttering while a distance of one inch will not. Furthermore, effective testing has been performed with the metal plates 46 having a 1/4 inch thickness such that the distance between the outer end 42 of the slit 40 and the first evacuation port 74 is thus 0.25 of an inch. Factors involved as to whether fluttering will occur depend upon stiffness of the sheet glass which is affected by its temperature when hot, the mass of the sheet glass for a given area, pressure differences between the upper and lower surfaces of the sheet glass, pressure differences between one stage of the vacuum drawing process and the next stage, the length of the slit along the direction of travel, planarity of the sheet glass, alignment of discrete glass sheets and whether there are any discontinuities at their junctions, and the difference between the slit thickness $t_s$ and the sheet glass thickness $t_g$ which is the spacing between the sheet glass G and the upper and lower metal plates surfaces 70 and 72 and hence controls the flow area.

With reference to FIGS. 3, 4 and 5, each slit seal 38*i* and 38*e* has its second evacuation port 76 located on the opposite sides of the sheet glass G at a location inwardly from the first evacuation port 74 between the adjacent pair of metal plates 52 and 58. The second pump 82 through the conduits 88 draws a vacuum within the second pair of vacuum chambers 56 communicated with the second evacuation port 76. Pump 82 has sufficient pumping capacity such that the vacuum in the second evacuation port at the sheets glass G is less than 0.53 times the pressure within the first evacuation port 74 so a second shock wave forms at this second stage of the vacuum drawing process both above and below the sheet glass in the same manner previously described in connection with the first stage. Since the air cannot exceed the speed of sound within the slit 40, further vacuum pumping does not cause a greater mass flow of air but rather permits a much greater vacuum to be drawn efficiently within the second evacuation port 76. In fact, vacuums of 1 to 20 torr have been efficiently established in this second stage of vacuum. The second evacuation port 76 is located sufficiently close to the first evacuation port 74 so that pressure differences on the opposite sides of the sheet glass G do not cause fluttering thereof within the slit seal for the same reasons previously discussed in connection with the first stage of vacuum. This distance for the illustrated embodiment is thus the thickness of the upper and lower metal plates 52 located above and below the sheet glass G, e.g. the 0.25 of an inch thickness of the upper and lower metal plates 52.

With further reference to FIGS. 3, and 5, each slit seal 38*i* and 38*e* has its third evacuation port 78 located on the opposite sides of the sheet glass G at a location inwardly from the second evacuation port 76. The third pump 84 through the conduit 90 draws a vacuum within the third pair of vacuum chambers 62 and is thus communicated between the plates 58 and 64 with the third evacuation port 78 both above and below the sheet glass G. A vacuum pump 84 has sufficient pumping capacity such that the vacuum in the third evacuation port 78 at the sheet glass G is less than 0.53 times the pressure within the second evacuation port 76 so that a third shock wave forms at this third stage of the vacuum drawing process both above and below the sheet glass in the same manner previously described. Since the air cannot exceed the speed of sound with the slit 40, further vacuum pumping does not cause a greater mass flow of air but rather permits drawing and efficient maintenance of a vacuum of 0.06 to 5 torr. Furthermore, the third evacuation port 78 is located sufficiently close to the second evacuation port 76 so pressure differences on the opposite sides of the sheet glass G do not cause fluttering thereof within the slit seal as previously discussed in connection with the first and second stages of vacuum. This distance for the illustrated embodiment is thus the thickness of the upper and lower metal plates 58 located above and below the sheet glass G, e.g. the 0.25 of an inch thickness of the upper and lower metal plates 58.

While both the ingress slit seal 38*i* illustrated in FIGS. 1 and 3 and the egress slit seal 38*e* illustrated in FIGS. 1 and 4 have the same construction, their operation differs only in the direction of movement since the ingress slit seal provides for the introduction of the sheet glass G into the system housing 22 for processing and the egress slit seal 38*e* provides for delivery of the processed sheet glass. When the sheet glass is heated during the processing, it can also be helpful to provide heating of the glass sheet within and/or outwardly from the egress slit seal 38*e* to prevent thermal shock that can cause breakage and to prevent thermal warpage which can distort planarity. In such cases, it may also be helpful to have the slit of the egress slit seal 38*e* of a slightly greater thickness than the slit of the ingress slit seal 38*i* to accommodate for changes in planarity of the sheet glass G. Otherwise, both of the slit seals are of the same construction as described above.

With reference to FIGS. 3, 4 and 5, the ingress slit seal 38*i* and the egress slit seal 38*e* each includes a roll seal assembly 94. These roll seal assemblies function best on the sheet glass surface that is not being processed so there is no contact that can distort the surface either before or after the processing. However, in some applications it may be possible to have the roll seal assemblies 94 located as shown on the opposite side of the sheet glass G. These roll seal assemblies as illustrated in FIG. 5 each include an upper or lower roll holder 96 and an associate roll 98 that is captured by the holder and that rollingly engage the sheet glass G. The rolls 98 are preferably made of graphite so as to be capable of withstanding high temperatures as well as having good lubricity.

Figure 7:
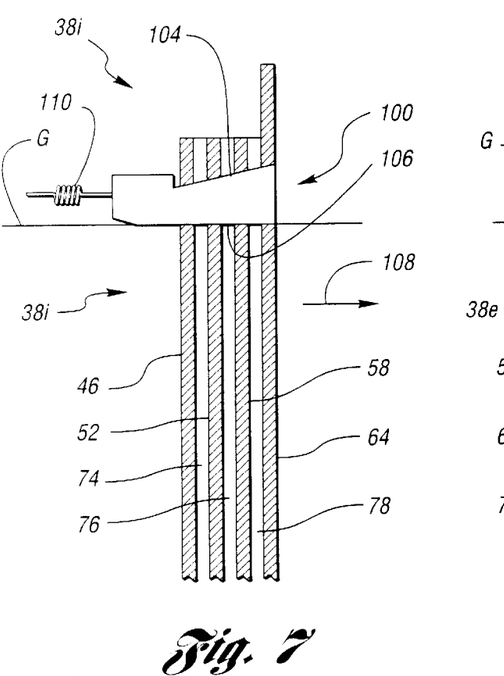
FIG. 7 is a view taken along the direction of line 7—7 in FIG. 3 to illustrate one construction of a side seal of the ingress of the slit seal.
Figure 8:
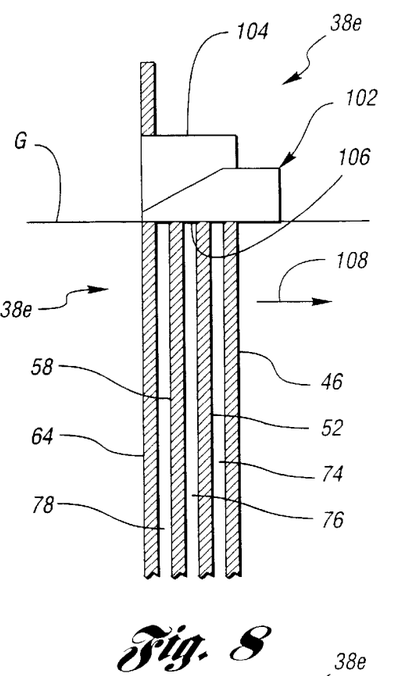
FIG. 8 is a view taken along the direction of line 8—8 in FIG. 4 to illustrate one construction of a side seal of the egress slit seal.

With reference to FIGS. 7 and 8, the ingress and egress slit seals 38*i* and 38*e* each includes associated side seals 100 and 102, respectively with a pair of such seals located at the opposite lateral ends of the slit defined by the metal plates 46, 52, 58 and 64. More specifically, each of the side seals 100 and 102 is disclosed as having outer and inner edges 104 and 106 that form a tapered shape that points in the opposite direction of sheet glass movement through the slit seals as illustrated by arrows 108. This tapered construction permits movement of the side seals to prevent binding when the sheet glass G moves the seals due to friction and/or variation in glass sheet width. The ingress side seal 100 shown in FIG. 7 is also disclosed as including a biasing spring 110 that counteracts the vacuum pressure pulling the side seal toward the right. The egress side seal 102 shown in FIG. 8 does not require any such biasing spring since the vacuum tends to maintain this side seal in place.

Figure 9:
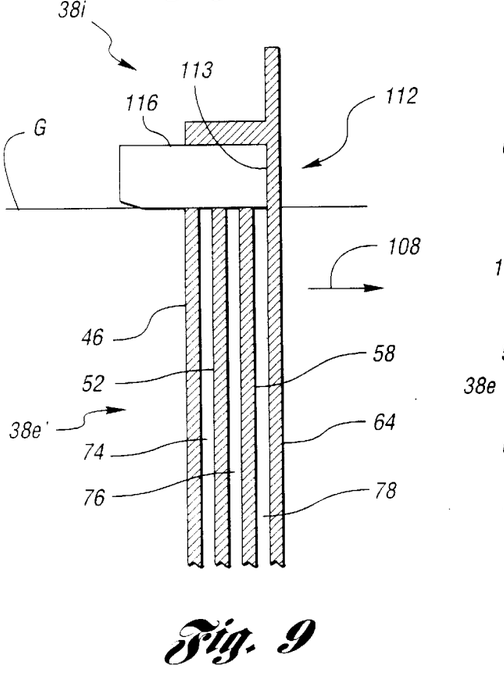
FIG. 9 is a view similar to FIG. 7 illustrating another construction of the slide seal of the ingress slit seal.
Figure 10:
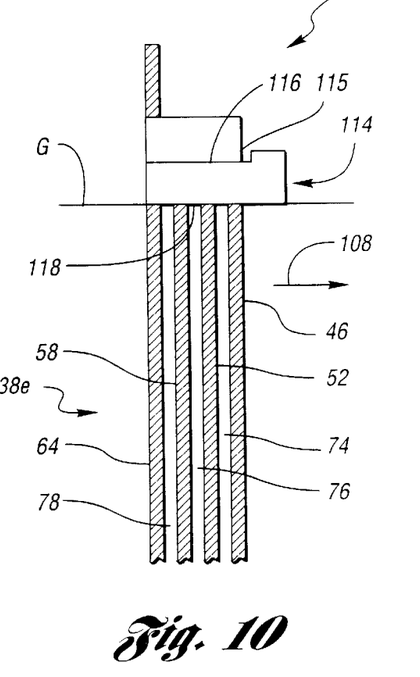
FIG. 10 is a view similar to FIG. 8 illustrating another construction of the slide seal of the egress slit seal.

With reference to FIGS. 9 and 10, the ingress slit seal 38*i* and the egress slit seal 38*e* are illustrated as including another construction of the side seals 112 and 114 which are located at opposite lateral ends of the slit defined by metal plates 48, 52, 58 and 64. Both the ingress side seal 112 and the egress side seal 114 have outer and inner edges 116 and 118 that extend parallel to each other rather than with a tapered shape as illustrated in FIGS. 7 and 8. The ingress and egress side seals 112 and 114 have associated stops 113 and 115 that limit the movement thereof under the operation of the vacuum.

The side seals 100, 102, 112 and 114 respectively illustrated in FIGS. 7, 8, 9 and 10 can be made of graphite which has high temperature resistance as well as good lubricity.

Figure 11:
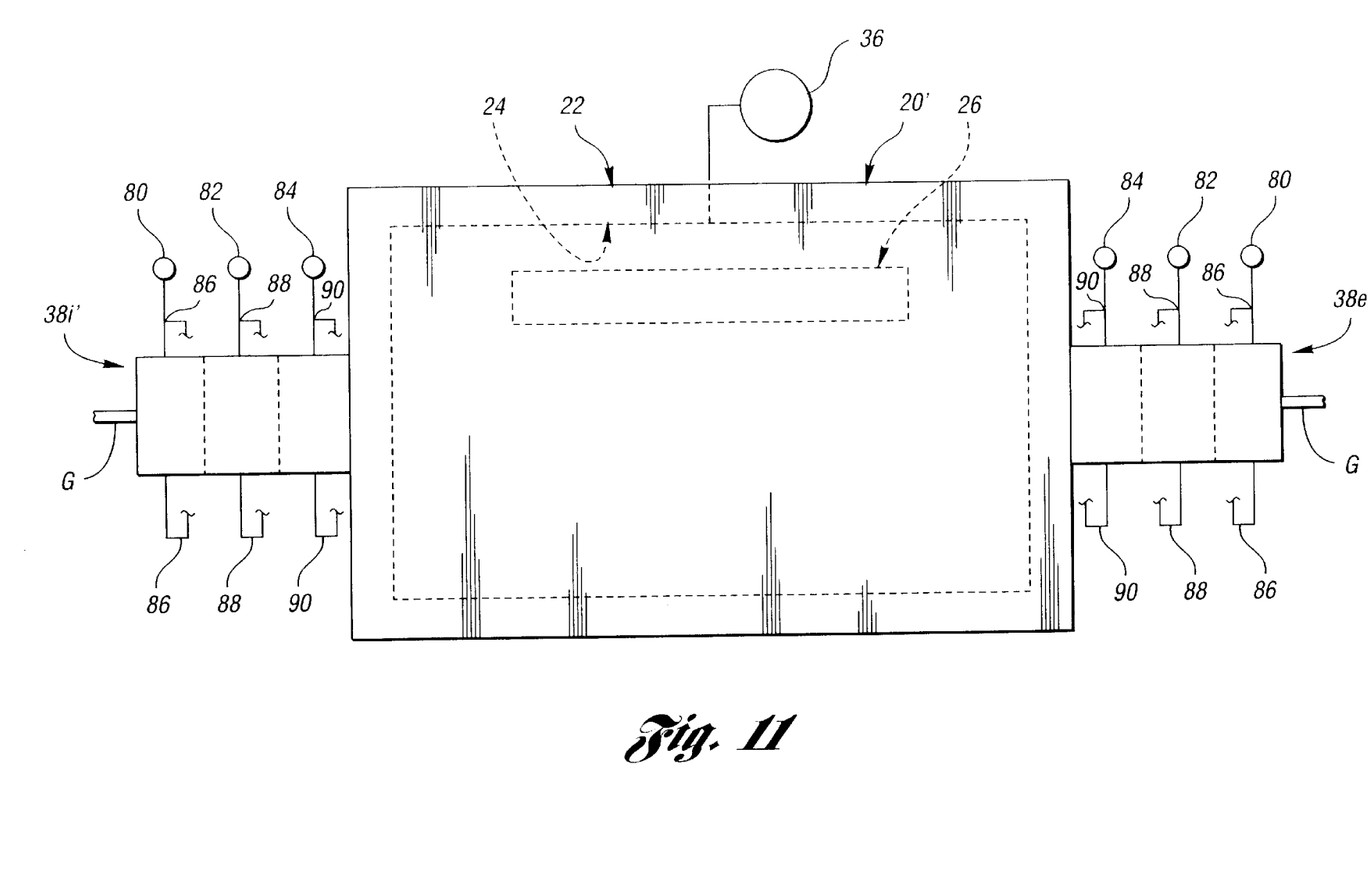
FIG. 11 is a longitudinal elevational view taken in the same direction as FIG. 1 but illustrating another embodiment of the processing system for processing sheet glass in accordance with the invention.
Figure 12:
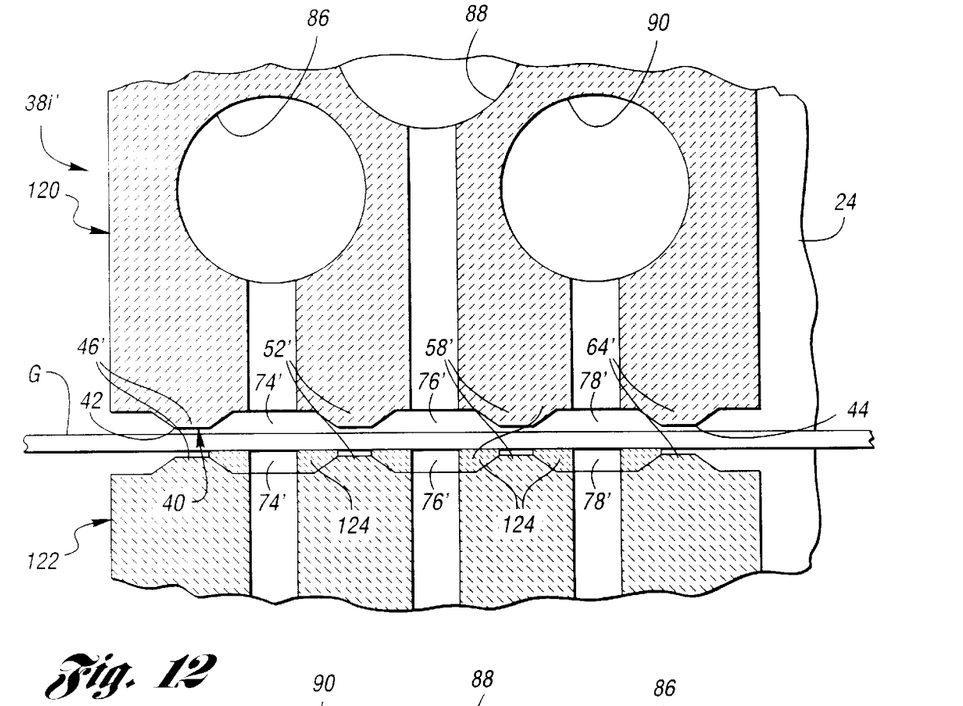
FIG. 12 is a view similar to FIG. 3 illustrating the ingress slit seal of the embodiment of FIG. 11.
Figure 13:
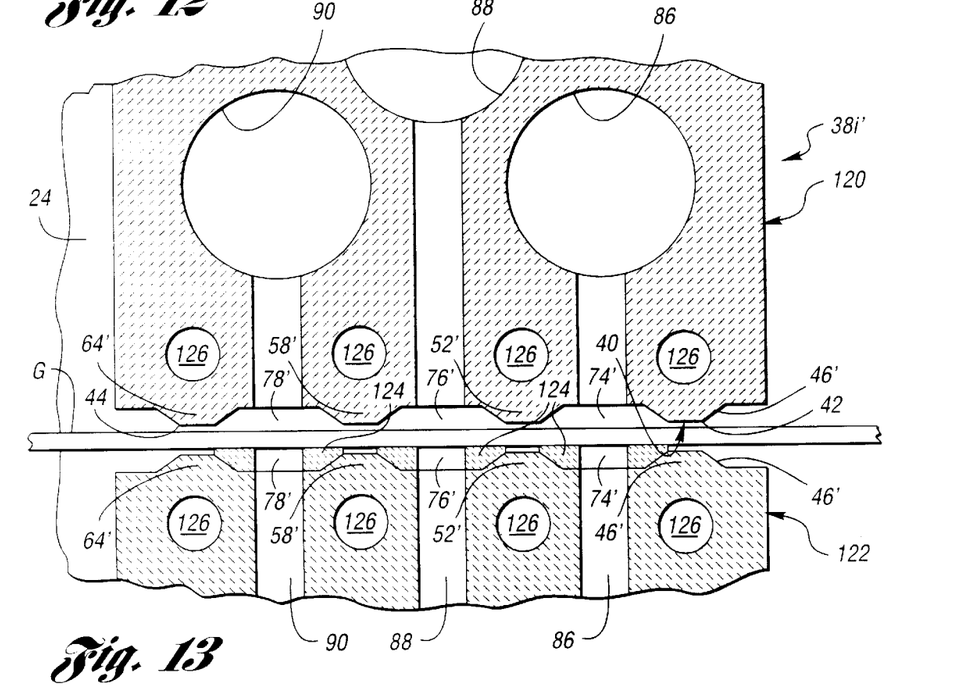
FIG. 13 is a view similar to FIG. 4 illustrating the egress slit seal of the embodiment of FIG. 11.

With reference to FIGS. 11–13, another embodiment of the processing system 20' has the same construction as the previously described embodiment except as will be noted and thus has like reference numerals applied to like components thereof and much of the previous description is applicable and will thus not be repeated. This embodiment of the processing system 20' as shown in FIGS. 12 and 13 has the ingress and egress slit seals 38*i*' and 38*e*' each including upper and lower refractory members 120 and 122 that define the slit 40 through which the sheet glass G passes between the environment and the housing processing chamber 24. The upper and lower refractory members 120 and 122 are most preferably made from sinter bonded fused silica particles so as to have a low coefficient of thermal expansion and thus good resistance to thermal warpage.

Above and below the sheet glass G, the upper and lower refractory members 120 and 122 respectively define cooperating pairs of downwardly extending and upwardly extending first, second, third and fourth projections 46', 52', 58' and 64' that define the slit 40 between its outer and inner ends 42 and 45 with the same spacing with respect to the sheet glass G as previously described. Between these projections 46', 52', 58' and 64', the refractory members 120 and 122 define first, second and third evacuation ports 74', 76' and 78' both above and below the sheet glass G being passed through the slit seal.

Vacuum pumps 80, 82 and 84 shown in FIG. 11 are respectively communicated by conduits 86, 88 and 90 with the evacuation ports 74', 76' and 78' shown in FIGS. 12 and 13 both above and below the sheet glass G being passed through the slit seal. The pumping capacity is sufficiently great so a shock wave forms at each of the three stages in the same manner previously described so that there is efficiency in pumping. Furthermore, the first evacuation port 74' is located sufficiently close to the outer end 42 of the slit 40 so that pressure differences between the upper and lower sides of the sheet glass G do not cause fluttering within the slit seal. Likewise, the second evacuation port 76' is located sufficiently close to the first evacuation port 74' so that pressure differences between the upper and lower sides of the sheet glass G do not cause fluttering within the slit seal, and the third evacuation port 78' is likewise located sufficiently close to the second evacuation port 76' so that pressure differences between the upper and lower sides of the sheet glass G do not cause fluttering within the slit seal. More specifically, each of the projections 46', 52', 58' and 64' has a truncated vertically pointing shape whose truncated surface defines the thickness of the slit 40 and which has a length along the direction of glass movement that is sufficiently small so that there is insufficient area for the pressure differences between the upper and lower sides of the sheet glass G to cause fluttering within the slit seal.

With continuing reference to FIGS. 12 and 13, each of the slit seals has its lower refractory member 122 provided with slide members 124 located between the lower truncated projections 46', 52', 58' and 64' to slidably support the sheet glass G during movement through the associated slit 40. These slide members are preferably made of graphite so as to have good temperature resistance as well as lubricity that facilitates the sheet glass sliding and have openings where necessary so as to cooperate with the associated lower refractory member 122 in defining the communication of the conduits 86, 88 and 90 with the first, second and third evacuation ports 74', 76' and 78' below the sheet glass G.

With reference to FIG. 13, the egress slit seal 38*i*' also is constructed to include heaters 126 that may be of the electric resistance type in order to maintain the sheet glass temperature upon delivery from the processing chamber when heated and to thereby prevent thermal shock that can cause breakage and/or thermal distortion of the sheet glass planarity. This can help avoid problems in passage of the processed sheet glass outwardly from the processing chamber 24 for delivery.

Figure 14:
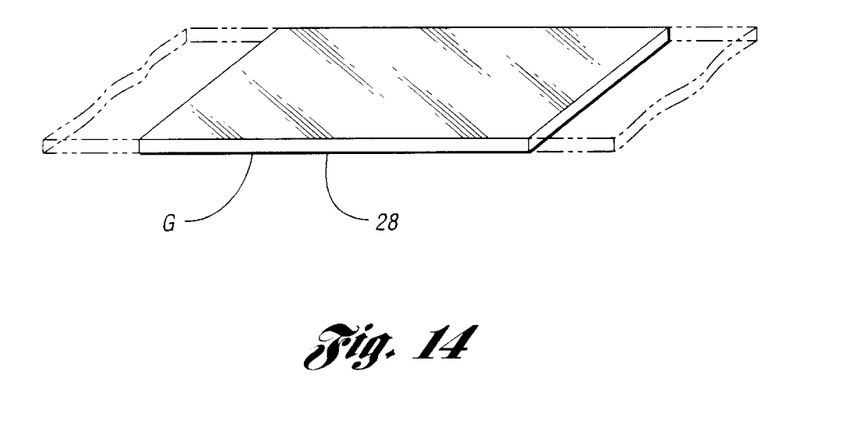
FIG. 14 is a perspective view illustrating discrete glass sheets which can be processed in accordance with the invention.
Figure 15:
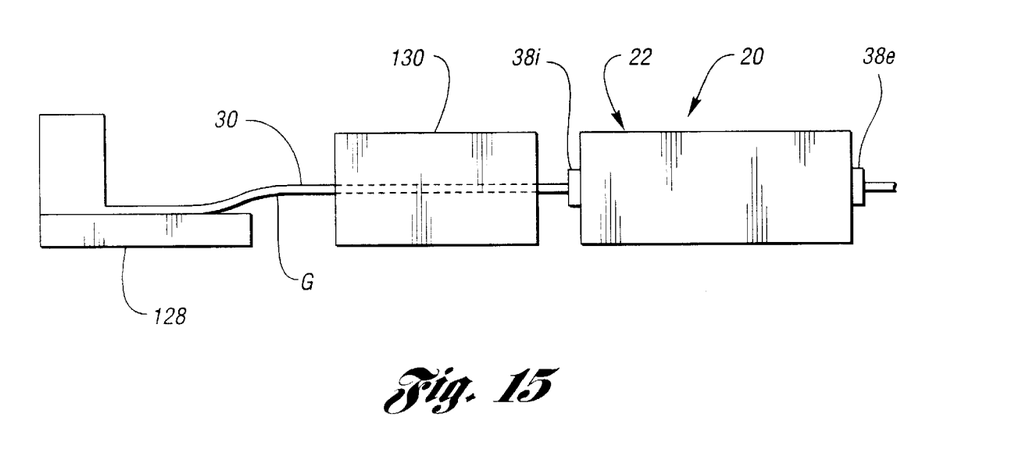
FIG. 15 is a schematic view that illustrates the manner in which a continuous glass ribbon can be processed in accordance with the invention.

As previously mentioned in connection with FIGS. 14 and 15, the sheet glass G that is processed and passed through the slit seals can be discrete sheets 28 such as shown in FIG. 14 and can also be a continuous glass ribbon 30 as illustrated in FIG. 15. In the latter case, the ribbon 30 is formed within a forming station 128 and can be passed initially through an edge trimmer 130 prior to passage of the newly formed ribbon into the system housing 22 through the ingress slit seal 38i for the processing prior to delivery through the egress slit seal 38e.

While the best modes for carrying out the invention have been described in detail, those familiar with the art to which this invention relates will recognize various alternative designs and embodiments for practicing the invention as defined by the following claims.

What is claimed is:

1. A processing system for processing sheet glass of a predetermined thickness, comprising:

a housing having an enclosed processing chamber in which the sheet glass is processed; and a slit seal through which the sheet glass is movable between the chamber and the environment, the slit seal defining a slit having an outer end communicated with the environment and an inner end communicated with the chamber, the slit having a thickness that is between 0.005 and 0.040 of an inch greater than the thickness of the sheet glass, an evacuation port located on opposite sides of the sheet glass at a location inwardly from the outer end of the slit, a pump for drawing a vacuum within the evacuation port and having sufficient pumping capacity such that the vacuum in the evacuation port at the sheet glass is less than 0.53 atmospheres of pressure so a shock wave forms, the evacuation port being located sufficiently close to the outer end of the slit so pressure differences on the opposite sides of the sheet glass do not cause fluttering thereof within the slit seal, and the slit seal including side seals.

2. A processing system for processing sheet glass as in claim 1 wherein the slit seal includes a second evacuation port located on the opposite sides of the sheet glass at a location inwardly from the first mentioned evacuation port, a second pump for drawing a vacuum within the second evacuation port and having sufficient pumping capacity such that the vacuum in the second evacuation port at the sheet glass is less than 0.53 times the pressure within the first mentioned evacuation port so a second shock wave forms, and the second evacuation port being located sufficiently close the first mentioned evacuation port so pressure differences on the opposite sides of the sheet glass do not cause fluttering thereof within the slit seal.

3. A processing system for processing sheet glass as in claim 2 wherein the slit seal includes a third evacuation port located on the opposite sides of the sheet glass at a location inwardly from the second evacuation port, a third pump for drawing a vacuum within the third evacuation port and having sufficient pumping capacity such that the vacuum in the third evacuation port at the sheet glass is less than 0.53 times the pressure within the second evacuation port so a third shock wave forms, and the third evacuation port being located sufficiently close to the second evacuation port so pressure differences on the opposite sides of the sheet glass do not cause fluttering thereof within the slit seal.

4. A processing system for processing sheet glass as in claim 1, 2 or 3 wherein the slit seal is an ingress slit seal through which the sheet glass enters the chamber.

5. A processing system for processing sheet glass as in claim 1, 2 or 3 wherein the slit seal is an egress slit seal through which the sheet glass exits the chamber.

6. A processing system for processing sheet glass as in claim 1, 2 or 3 wherein the slit seal is an ingress slit seal through which the sheet glass enters the chamber; and the system further including an egress slit seal through which the sheet glass exits the chamber, the egress slit seal defining a slit having an outer end communicated with the environment and an inner end communicated with the chamber, the slit of the egress slit seal having a thickness that is between 0.005 and 0.040 of an inch greater than the thickness of the sheet glass, an evacuation port located on opposite sides of the sheet glass at a location inwardly from the outer end of the egress slit seal, a pump for drawing a vacuum within the evacuation port of the egress slit seal and having sufficient pumping capacity such that the vacuum in the evacuation port of the egress slit seal at the sheet stock is less than 0.53 atmospheres of pressure so a shock wave forms, the evacuation port of the egress slit seal being located sufficiently close to the outer end of the slit of the egress slit seal so pressure differences on the opposite sides of the sheet glass do not cause fluttering thereof within the egress slit seal, and the egress slit seal including side seals.

7. A processing system for processing sheet glass as in claim 6 wherein the egress slit seal includes a second evacuation port located on the opposite sides of the sheet glass at a location inwardly from the first mentioned evacuation port of the egress slit seal, a second pump for drawing a vacuum within the second evacuation port of the egress slit seal and having sufficient pumping capacity such that the vacuum in the second evacuation port of the egress slit seal at the sheet glass is less than 0.53 times the pressure within the first mentioned evacuation port of the egress slit seal so a second shock wave forms within the egress slit seal, and the second evacuation port of the egress slit seal being located sufficiently close to its first mentioned evacuation port so pressure differences on the opposite sides of the sheet glass do not cause fluttering thereof within the egress slit seal.

8. A processing system for processing sheet glass as in claim 7 wherein the egress slit seal includes a third evacuation port located on the opposite sides of the sheet glass at a location inwardly from the second evacuation port of the egress slit seal, a third pump for drawing a vacuum within the third evacuation port of the egress slit seal and having sufficient pumping capacity such that the vacuum in the third evacuation port of the egress slit seal at the sheet glass is less than 0.53 times the pressure within the second evacuation port of the egress slit seal so a third shock wave forms within the egress slit seal, and the third evacuation port of the egress slit seal being located sufficiently close to its second evacuation port so pressure differences on the opposite sides of the sheet glass do not cause fluttering thereof within the egress slit seal.

9. A processing system for processing sheet glass as in claim 1 wherein the slit seal includes a roll seal assembly.

10. A processing system for processing sheet glass as in claim 9 wherein the roll seal assembly includes a graphite roll.

11. A processing system as in claim 10 which includes a pair of the roll assemblies located on the opposite sides of the sheet glass.

12. A processing system for processing sheet glass as in claim 1 wherein the side seals include outer and inner edges that form a tapered shape.

13. A processing system as in claim 1 wherein the side seals include outer and inner edges that extend parallel to each other.

14. A processing system for processing sheet glass as in claim 1 which includes metal plates that define the slit of the slit seal.

15. A processing system for processing sheet glass as in claim 1 or 14 which includes a roll conveyor for conveying the sheet glass through the slit seal.

16. A processing system for processing sheet glass as in claim 1 which includes refractory members that define the slit of the slit seal.

17. A processing system for processing sheet glass as in claim 1 or 16 which includes at least one slide member on which the sheet glass is slidably movable through the slit of the slit seal.

18. A processing system for processing sheet glass as in claim 17 wherein the slide member is made of graphite.

19. A method for processing sheet glass of a predetermined thickness within an enclosed processing chamber, comprising:

passing the sheet glass through a slit seal having a slit that communicates the processing chamber and the environment, that has a thickness between 0.005 and 0.040 of an inch greater than the thickness of the sheet glass, and that has side seals for sealing with the sheet glass;

drawing a vacuum within a evacuation port of the slit seal on opposite sides of the sheet glass with sufficient capacity so the vacuum in the evacuation port at the sheet glass is less than 0.53 atmospheres of pressure so a shock wave forms, and with the vacuum being drawn within the evacuation port at a location sufficiently close to the outer end of the slit of the slit seal so pressure differences on opposite sides of the sheet glass do not cause fluttering thereof within the slit seal.

20. A method for processing sheet glass as in claim 19 wherein a vacuum is drawn within a second evacuation port located on opposite sides of the sheet glass at a location inwardly from the first mentioned evacuation port and with sufficient capacity so the vacuum in the second evacuation port at the sheet glass is less than 0.53 times the pressure within the first mentioned evacuation port such that a second shock wave forms, and with the vacuum being drawn in the second evacuation port at a location sufficiently close to the first mentioned evacuation port so pressure differences on the opposite sides of the sheet glass do not cause fluttering thereof within the slit seal.

21. A method for processing sheet glass as in claim 20 wherein a vacuum is drawn within a third evacuation port located on opposite sides of the sheet glass at a location inwardly from the second evacuation port and with sufficient capacity so the vacuum in the third evacuation port at the sheet glass is less than 0.53 times the pressure within the second evacuation port such that a third shock wave forms, and with the vacuum being drawn in the third evacuation port at a location sufficiently close to the second evacuation port so pressure differences on the opposite sides of the sheet glass do not cause fluttering thereof within the slit seal.

22. A method for processing sheet glass as in claim 19, 20, or 21 wherein the sheet glass is introduced into the chamber through the slit seal.

23. A method for processing sheet glass as in claim 19, 20, or 21 wherein the sheet glass is delivered out of the chamber through the slit seal.

24. A method for processing sheet glass as in claim 19, 20 or 21 wherein the sheet glass is introduced into the chamber through the slit seal and is delivered out of the chamber through another slit seal in which a shock wave is also formed.

25. A method for processing sheet glass as in claim 19, 20 or 21 wherein the sheet glass is conveyed on a roll conveyor through the slit seal.

26. A method for processing sheet glass as in claim 19, 20 or 21 wherein the sheet glass is supported by at least one slide member during movement through the slit seal.

27. A method for processing sheet glass as in claim 19, 20 or 21 wherein the sheet glass moved through the slit seal is discrete glass sheets.

28. A method for processing sheet glass as in claim 19, 20 or 21 wherein the sheet glass moved through he slit seal is a continuous glass ribbon.

* * * * *